Aug. 9, 1960    H. R. MIOTKE    2,948,078
CATAPULT LINE CASTING DEVICE
Filed Oct. 9, 1957    2 Sheets-Sheet 1
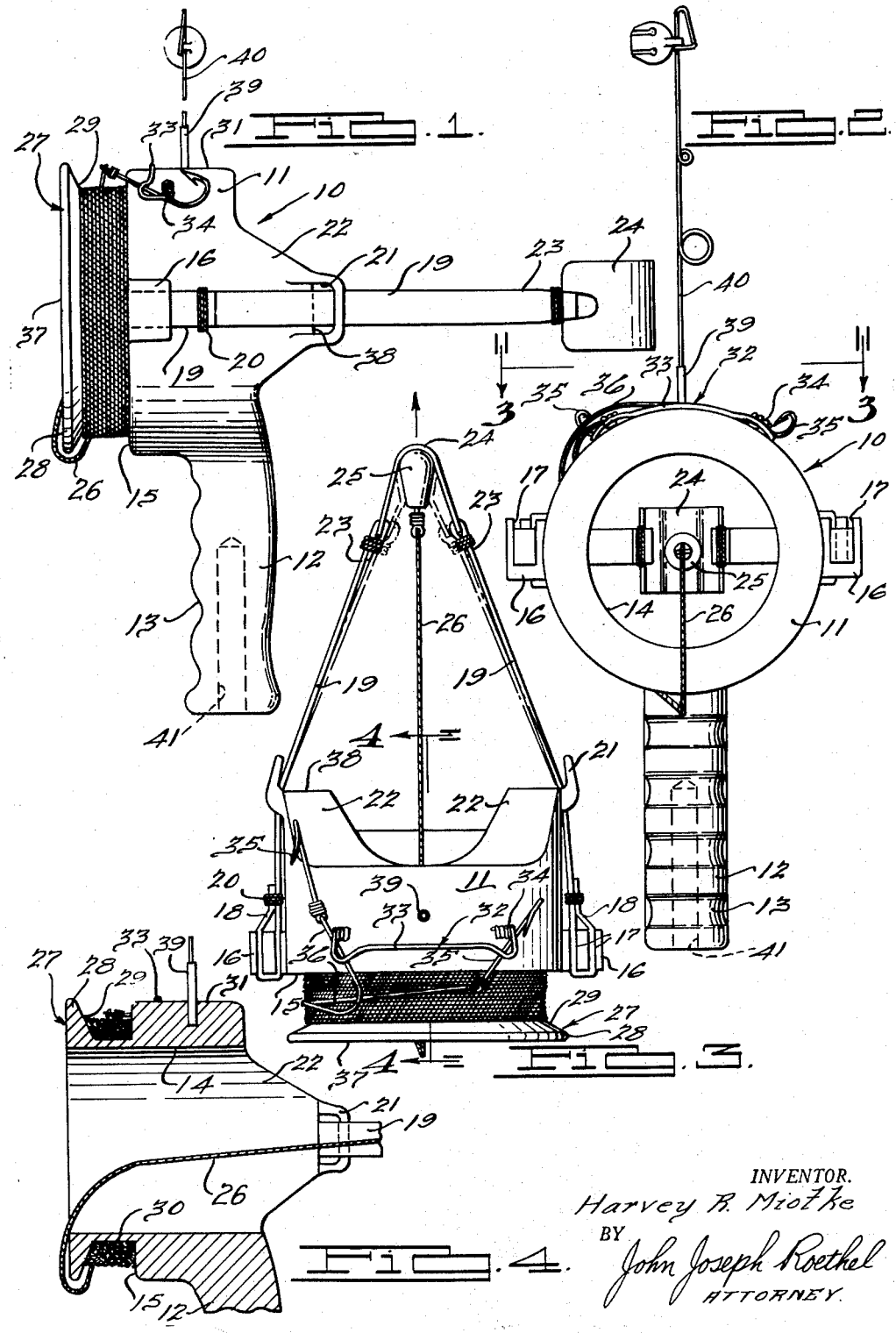
INVENTOR.
Harvey R. Miotke
BY
John Joseph Roethel
ATTORNEY.

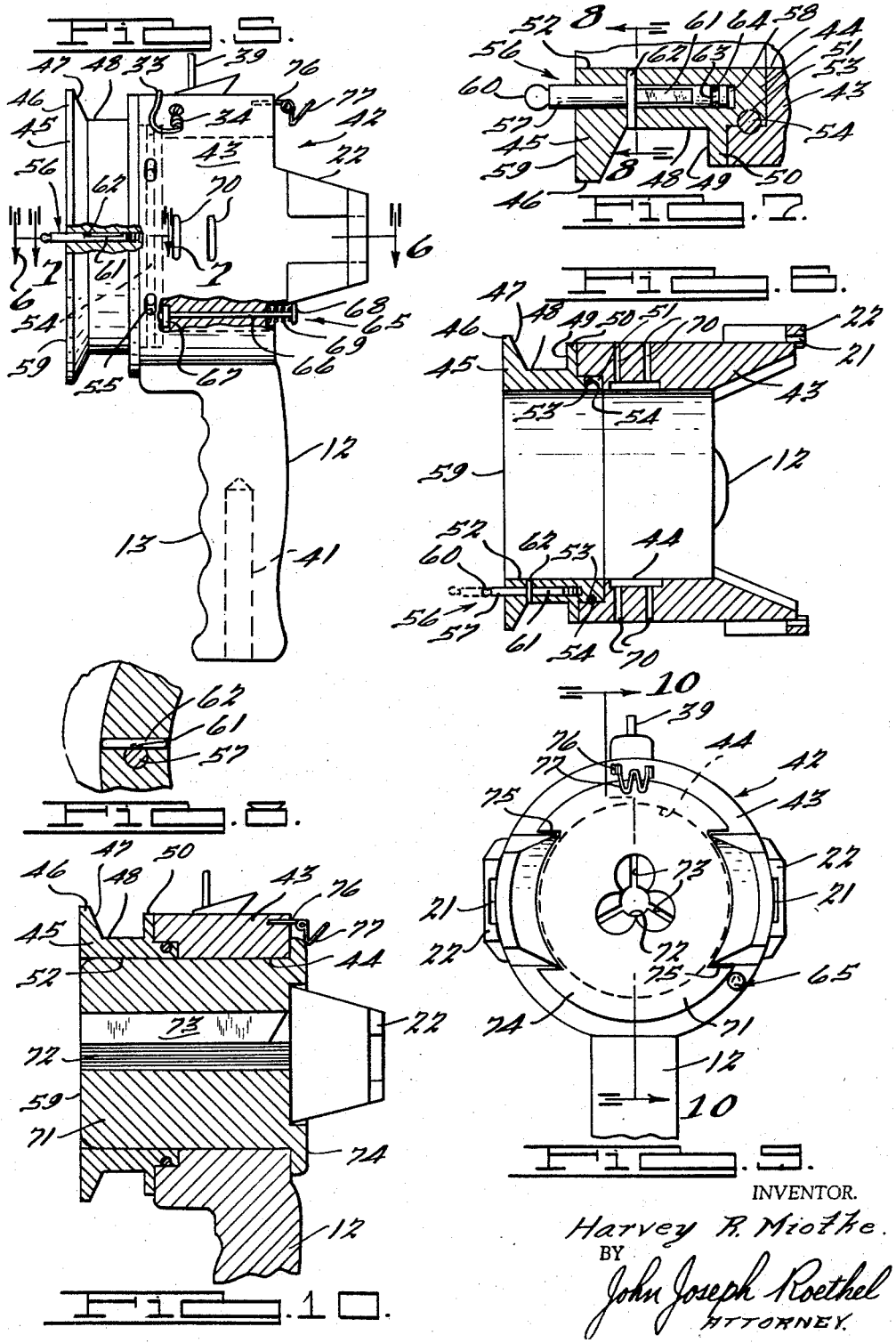

United States Patent Office 2,948,078
Patented Aug. 9, 1960

2,948,078

CATAPULT LINE CASTING DEVICE

Harvey R. Miotke, 19314 Hamburg, Detroit 5, Mich.

Filed Oct. 9, 1957, Ser. No. 690,180

1 Claim. (Cl. 43—19)

This invention relates to a line casting device and more particularly to a line casting device of the sling shot or catapult type adapted to be used by sportsmen to propel or cast a fish lure or the like to a desired spot on a body of water or to shoot an arrow or the like at a target.

The catapult device embodying the present invention comprises a cylindrical body member having a depending hand grip portion located substantially at its rear portion. The body portion is provided with a line receiving member or portion concentrically mounted on the front thereof. The line receiving member or portion has a flange at its front edge and a circumferential depression extending rearwardly of the flange, the depression being adapted to receive the reeled line and the latter being adapted to unreel over the flange. The body member and the line receiving member or portion are provided with an axially extending large diameter bore. The body member is provided rearwardly of the line receiving means on each side thereof with a slotted portion to which one end of an elastic sling member is attached, there being a sling member for each side of the body portion. The body member is provided with longitudinal appendages extending to the rear and through which the sling members pass, the appendages supporting and guiding the sling members intermediate their ends. The free or rear ends of the sling members are attached to a projectile engaging means.

For use as a fish lure casting device the body member is provided with a retaining means for releasably holding fish hooks or the like or portions of the fish hook leaders until the same are forceably dislodged by the momentum of a projectile or weighted object, such as a sinker, which has been propelled through the body portion by the elastic sling members. Should it be desired to use the casting device for shooting arrows, darts or the like, a simple adaptor is inserted in the axial bore of the body member and its attached line receiving member or portion. The adaptor reduces the diameter of the bore to a size suitable to receive and guide the arrow, dart or the like as it is launched in flight.

In one embodiment of the invention the line receiving member or portion is non-rotatably mounted on the body member and it is necessary to hand wind the line on the line receiving portion after each shot. A second embodiment is illustrated in which the line receiving member is rotatably mounted so as to be operable as a reel to retrieve the line after each shot. A suitable hand crank is provided to facilitate the reeling operation. Also, a suitable braking mechanism is provided to prevent rotation of the reel in an unwinding direction when desired.

Although catapult devices of the general class embodying the present invention have heretofore been developed, it is an object of the present invention to provide an improved catapult device which is primarily less subject to line entanglement. It is a further object to provide a device of this type which is light weight and compact and relatively inexpensive to manufacture.

Other objects, features and advantages of the present invention will appear from the following description and appended claim taken in conjunction with the accompanying drawing, wherein:

Fig. 1 is a side elevational view of a catapult or sling shot type casting or arrow or dart shooting device constructed in accordance with one embodiment of the present invention;

Fig. 2 is a front elevational view of the embodiment of Fig. 1;

Fig. 3 is a plan view looking in the direction of the arrows 3—3 of Fig. 2;

Fig. 4 is a sectional view taken substantially through line 4—4 of Fig. 3 looking in the direction of the arrows;

Fig. 5 is a view in part similar to Fig. 1 illustrating a second embodiment of the present invention;

Fig. 6 is a sectional view taken substantially through the line 6—6 of Fig. 5 looking in the direction of the arrows;

Fig. 7 is an enlarged sectional view taken substantially through line 7—7 of Fig. 1 looking in the direction of the arrows;

Fig. 8 is an enlarged sectional view taken substantially through line 8—8 of Fig. 7 looking in the direction of the arrows;

Fig. 9 is a rear elevational view of the catapult device illustrating the appearance thereof with an arrow or dart adaptor in place; and Fig. 10 is a sectional view taken substantially through line 10—10 of Fig. 9 looking in the direction of the arrows.

Before explaining in detail the present invention it is to be understood that the invention is not limited in its application to the details of construction and arrangements of parts illustrated in the accompanying drawing, since the invention is capable of other embodiments and of being practiced or carried out in various ways. Also it is to be understood that the phraseology or terminology employed herein is for the purpose of description and not of limitation.

This application is a continuation-in-part of my co-pending application Serial No. 572,023, filed March 16, 1956, now abandoned.

The embodiment of the sling shot or catapult type casting device illustrated in Figs. 1 to 4, inclusive, and generally designated 10, comprises a main body portion 11. The main body portion 11 is substantially cylindrical in shape having a depending hand grip portion 12 attached thereto. The hand grip portion 12 may be provided with finger grooves 13 to aid in the grasping or gripping of the device. The main body portion is provided with a large central aperture 14.

Near its front face 15 the main body portion is provided on its cylindrical surface with two diametrically opposite ears 16. In the illustrated embodiment, the ears 16 are slotted at 17 to permit the ends 18 of the elastic sling members 19 to be threaded through the slots and doubled back so that they can be tied or knotted against slipping in any convenient manner, as shown at 20. It will be understood that any convenient means of securing the ends of the elastic members 19 to the body portion may be used. The elastic sling members 19 are threaded through guide eyes 21 which may be formed as integral portions of rearwardly extending projections 22 of the main body portion 11. The opposite ends 23 of the elastic sling members 19 are conveniently tied to a projectal seat member 24, the latter being of sufficient size to accommodate the usual lead sinker 25 which is adapted to be attached to a fishing line 26. The fishing line 26 is adapted to be wound about a fish line receiving member 27 concentrically mounted on the front face 15 of the main body member 11. It will be noted that the line receiving member 27 is provided with a flange portion 28 having a conically shaped surface 29 leading down to the line receiving portion 30 of the line receiving member 27.

As illustrated in Fig. 4, the line receiving member 27 may be made as an integral part of the main body portion 11 or, if desired, it may be made as an attachment to the front face 15 of the main body portion 11. A spring clip 32 is mounted on the top surface 31 of the main body portion 11. The spring clip 32 comprises a piece of spring wire 33 which extends across the top surface 31 of the main body portion 11 and is bent with substantially the same radius of curvature as the surface 31. At each of its ends the main portion 33 of the spring clip 32 terminates in coiled portions 34. The coiled end portions 34 permit the spring clip to be flexed away from the upper surface 31 on the main body portion 11 so that the fish hook 35 or the leader 36 attaching the fish hook to the fish line 26 may be hooked under the ends of the spring clip 32, as most clearly seen in Fig. 3.

In actual operation, it will be understood that the fish hooks 35 will be baited. The fish hook leader lines 36 will be knotted to the fish line 26 some distance from the end thereof to which the lead sinker 25 is attached. Preferably, the length of line between the sinker 25 and the point at which the leaders are attached to the fishing line 26 should be sufficient so that none of the leaders will be fed into the aperture 14. To cause a cast to be made, the lead sinker 25 will be dropped into the projectile seat and the latter will be gripped by the fingers, as is usually done with a sling shot device, the projectile seat assuming the appearance shown in dot and dash outline in Fig. 3. The elastic members 19 will be drawn back and stretched until approximately the desired amount of tension is achieved which it is estimated will project the lead sinker 25 the desired distance out across the water. As the lead sinker 25 flies through the center aperture 14 of the catapult device it will cause the fish line to unwind from the line receiving member 27. This in turn will cause the lead lines 36 to unwind therefrom until the fish hooks 35 are snapped out from under the spring clip 32. With the bait properly engaged on the fish hook 35, the bait will no more be inclined to become disengaged from hook than it would under ordinary casting procedure.

It is desirable that in their inoperative position, as seen in Fig. 1, the length of the elastic sling members 19 from the guide eyes 21 to the projectile seat 24 does not exceed the distance from the front face 27 of the line receiving member to the rear face 38 of the main body portion, that is, substantially the point at which the members 19 pass through the guide eyes 21. It has been found that, if the length of the elastic members 19 between the guide eyes 21 and the projectile seat member 24 exceeds the combined length of the body portion 11 and line receiving portion 27, the projectile seat member will be thrown completely through the aperture 14 into a position in which it can become entangled with the fish line 26 as the latter is unreeling from the line receiving member 27. Accordingly, if the length of the sling members 19 is substantially as shown in the drawing, particularly in Fig. 1, the travel of the projectile seat member 24 through the aperture 14 will be brought up short of any possibility of entanglement with the fishing line 26.

It will be noted that the catapult device 10 embodying the present invention may be provided with a tube 39 projecting upwardly from the upper surface 31 thereof, the tube being adapted to receive a bell supporting wire 40. The handle portion 12 may be provided with an upwardly extending aperture 41 so that the casting device may be placed on a stake inserted in the ground. With the casting device placed on such a stake and with the fish line 26 hooked up to the bell wire 40, the device may then be used in a conventional manner for still fishing.

In the embodiment which has just been described the line receiving member or portion 27 is a fixed reel and it is necessary to wind the line on the reel with a proper circular hand motion. In the embodiment of Figs. 5 to 8, inclusive, now to be described, provision is made for a rotatably mounted reel adapted to be manipulated by a hand crank whereby the reel may be rotated to rewind the line.

The catapult type casting device of the present embodiment, herein designated 42, again comprises a substantially cylindrical body member 43 having a depending hand grip portion 12 attached at its rear end. The hand grip portion 12, as in the previously described embodiment, may be provided with a finger groove 13 to facilitate gripping the same and with a longitudinally extending hole 41 for impaling the device on a stake or the like when used in the ground when used for still fishing. The cylindrical body portion 43 is provided with a large axially extending bore or aperture 44.

In the present embodiment the line receiving member comprises a reel 45 which is rotatably secured to the front of the body member. On its periphery the reel 45 is provided with a flange portion 46 having a conically shaped surface 47 leading down to a line receiving recess or portion 48. The rear edge 49 of the recess 48 is defined by a second flange 50. This second flange 50 also acts as a shoulder adapted to abut the front face of the cylindrical body member 43.

As best seen in Fig. 6, the body member bore or aperture 44 is counterbored at the front end thereof to receive the end portion 51 of the reel 45. The reel 45 is also provided with an axially extending bore or aperture 52 equal in diameter to the bore or aperture 44 of the body member. The end portion 51 of the reel 45 is provided with a peripheral groove 53 which is a part of the means for rotatably retaining the reel on the body member 43. It will be noted, see Figs. 5 and 6, that the body member carries a pair of spaced parallel pins 54 which pass through the counterbore wall in such a manner as to intersect the reel end portion groove 53 at each side of the reel end portion. Suitable access holes 55 are provided in the outer surface of the body member to permit the insertion or removal of the pins 54.

The reel 45 is provided with a crank means, generally designated 56, to facilitate the re-winding of the line 26. The crank means 56 comprises an elongated pin 57 slidably mounted in an elongated cylindrical recess 58 which opens through the front face 59 of the reel. As best seen in the enlarged sectional view, Fig. 7, the pin 57 has an end portion provided with a small knob 60. The knob 60 may be grasped to pull the pin 57 normal in position to its operative out position, that is, from its solid outline position to the dot and dash outline position as shown in Fig. 6.

The pin 57 is provided intermediate its ends with a longitudinally extending flat 61. The ends walls of the flat are adapted to abut a pin 62 carried in the wall of the reel 45 and lying in tangential relation to the flat 61, see Fig. 8.

At its right end, as viewed in Fig. 7, the pin 62 is provided with a peripheral groove 63 in which is positioned a split ring 64 made of spring steel or the like. The split ring 64 is effective to yieldingly maintain the pin 62 in any position in which placed within its range of movement permitted by length of the flat 61.

An additional feature of the present embodiment is the provision of a braking device, generally designated 65, for preventing rotation of the reel 45 after a desired amount of line has been played out. The braking device 65 comprises an elongated pin or pluanger 66 having a braking disk 67 on its inner face adapted to engage the inner face of the reel 45 and a knob 68 on its outer exposed end, see Fig. 5. A retracting spring 69 is provided to restore the plunger 66 to its normal inoperative position. The braking device 65 is located in a position in which it may be conveniently operated by thumb pressure.

In the previously described embodiment the ends 18 of the sling members 19 were attached to slotted ears 16 which projected from the sides of the cylindrical body member 11. In the present embodiment the ears are eliminated, the body member 43 having the sling end receiving slots 70 cut into the wall thereof. It is believed readily apparent as to how the free end 18 of the sling member may be fed into one slot 70 and brought out through the second slot and then tied at 20, as in Fig. 1.

With reference to Figs. 9 and 10, there is illustrated the simple manner in which the catapult device of either embodiment may be easily adapted for the shooting of arrows or darts. All that is required is an adaptor 71 comprising a cylindrical member having an external diameter providing a loose fit within the body member 44. The adaptor preferably is of a length equal to the length of the body member 11 and attached reel 45.

The adaptor is provided with a longitudinally extending central bore 72 of a diameter suitable to freely accommodate the shaft of an arrow or the like. If desired, the adaptor may be slotted as at 73 to accommodate the feathers or vanes fastened to the butt of the shaft.

The adaptor 71 is provided with a flange 74 suitably notched as at 75 to fit around the projections 22 on the body member 43. A suitable spring device 76 mounted in the body member 43 and having a flange engaging portion 77 may be provided, as shown, to retain the adaptor 71 in place during ordinary handling of the catapult device.

The foregoing described embodiments of the present invention provide simple, inexpensive and accurate casting of arrow or dart propelling devices particularly well adapted for use in areas where low overhanging branches or dense undergrowth and the like prevent the use of more conventional casting equipment or arrow shooting gear.

I claim:

A line casting device adapted to propel a projectile carrying line comprising a cylindrical body member provided with an axially extending bore therethrough, handle means located at substantially the rear portion of said body member and extending radially thereof, said body member at the front thereof being provided with line receiving means, said line receiving means having a flanged front face and a line receiving recess extending rearwardly thereof over which the line is adapted to unreel from said recess, elastic sling members, slotted means located rearwardly of said recess on said body member for retaining one end of each sling member, said sling members extending rearwardly of said body member from said slotted means, said body member being provided with longitudinally extending appendages thereon through which said sling members pass, said appendages supporting and guiding said sling members intermediate the ends thereof, projectile engaging means attached to the other ends of said sling members, and retaining means comprising a U-shaped spring clip having an elongated curved center portion extending circumferentially across the top of said body member and leg portions extending longitudinally of said body member, the end portions of said leg portions terminating in coiled portions attached to said body member and providing for flexing of said center portion away from the peripheral surface of said body member of receive a part of a lure means attached to said line therebeneath, said spring clip being adapted to releasably hold said part of the lure means against said peripheral surface until said lure means is forceably disengaged therefrom in a direction axially of said body member by the momentum of said projectile upon the latter being propelled axially through the body member bore by said sling members, the distance from said appendages to the projectile engaging means in unextended condition of the sling members being less than the distance between the front of said line receiving means to said appendages whereby said projectile engaging means is normally unable to follow a projectile through the bore in the body member to the extent that entanglement of said line would occur as the latter unreels.

References Cited in the file of this patent

UNITED STATES PATENTS

| | | |
|---|---|---|
| 865,613 | Schreidt | Sept. 10, 1907 |
| 1,662,983 | Pflueger | Mar. 20, 1928 |
| 2,808,043 | Lombard | Oct. 1, 1957 |